(12) United States Patent  
Tsai

(10) Patent No.: US 9,341,853 B2  
(45) Date of Patent: May 17, 2016

(54) STEREO IMAGE DISPLAYING SYSTEM AND STEREO IMAGE CAPTURING SYSTEM

(75) Inventor: Chih-Hsien Tsai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 754 days.

(21) Appl. No.: 13/584,824

(22) Filed: Aug. 14, 2012

(65) Prior Publication Data

US 2014/0049618 A1    Feb. 20, 2014

(51) Int. Cl.  
*G02B 27/22* (2006.01)  
*H04N 9/31* (2006.01)

(52) U.S. Cl.  
CPC ........ *G02B 27/2221* (2013.01); *G02B 27/2235* (2013.01); *G02B 27/2292* (2013.01); *H04N 9/3185* (2013.01)

(58) Field of Classification Search  
USPC .......... 353/7, 10, 98; 359/458, 471, 472, 466, 359/479; 349/15; 348/49, 50, 54, 59; 352/57, 60, 61  
See application file for complete search history.

(56) References Cited

U.S. PATENT DOCUMENTS

| 7,168,809 | B2  |   | 1/2007  | Hoshino et al. |
| 7,233,441 | B2  | * | 6/2007  | Sonehara ........... G02B 27/2214 348/E13.03 |
| 8,746,894 | B2  | * | 6/2014  | Atkins ............................ 353/77 |
| 2003/0234909 | A1 | * | 12/2003 | Collender et al. ................ 353/7 |
| 2008/0036969 | A1 | * | 2/2008  | Otsuka et al. ..................... 353/7 |
| 2008/0266523 | A1 | * | 10/2008 | Otsuka et al. ..................... 353/7 |
| 2011/0043611 | A1 | * | 2/2011  | Javidi et al. ..................... 348/46 |

* cited by examiner

*Primary Examiner* — William C Dowling  
(74) *Attorney, Agent, or Firm* — Jianq Chyun IP Office

(57) ABSTRACT

A stereo image displaying system including an image displaying apparatus and an imaging element is provided. The image displaying apparatus displays image beams along an optic axis. The imaging element has a curved-surface. The curved-surface receives the image beams and converts the image beams into deformation images. The imaging element transmits the deformation images. Furthermore, a stereo image capturing system is also provided.

16 Claims, 17 Drawing Sheets

STEREO IMAGE DISPLAYING SYSTEM AND STEREO IMAGE CAPTURING SYSTEM

BACKGROUND OF THE INVENTION

1. Technical Field

The invention relates to an image displaying system and an image capturing system, more particularly to a stereo image displaying system and a stereo image capturing system.

2. Background

With development of display technology, displays having better image quality, richer color performance, and better performance effect are continuously developed. In recent years, a stereo display technology has extended from cinema applications to home display applications. Since a key technique of the stereo display technology is to ensure a left eye and a right eye of a user to respectively view left-eye images and right-eye images of different viewing angles, according to the conventional stereo display technology, the user generally wears a special pair of glasses to filter the left-eye images and the right-eye images.

However, to wear the special pair of glasses may generally cause a lot of inconveniences, especially for a nearsighted or farsighted user who has to wear a pair of glasses with corrected vision, and the extra pair of special glasses may cause discomfort and inconvenience. Therefore, an advanced stereo image displaying technology becomes one of the key focuses in researches and developments. The stereo image displaying technology may be implemented based on the imaging principle of real images or virtual images. U.S. Pat. No. 7,168,809 discloses an image displaying apparatus. The image displaying apparatus disclosed that images are transmitted to a mirror, and the mirror reflects the images displayed from the image displaying apparatus to a screen. The user may see real images displayed on the screen and feel stereo images.

SUMMARY

An exemplary embodiment of the invention provides a stereo image displaying system, and the user(s) may sense stereo image(s) by the stereo image displaying system.

Another exemplary embodiment of the invention provides a stereo image capturing system, and stereo image capturing system is capable of capturing stereo image information associated with an object.

Other objects and advantages of the invention may be further understood by referring to the technical features broadly embodied and described as follows.

To achieve a part or all or other objects and advantages of the invention, an embodiment of the invention provides a stereo image displaying system, and the stereo image displaying system includes an image displaying apparatus and an imaging element. The image displaying apparatus displays image beams along an optic axis. The imaging element has a curved-surface. The curved-surface receives the image beams and converts the image beams into deformation images. The imaging element transmits the deformation images.

Another embodiment of the invention provides a stereo image capturing system, and the stereo image capturing system includes an image capturing apparatus and an imaging element. The imaging element has a curved-surface. The curved-surface receives stereo light beams associated with an object and converts the stereo light beams into image beams having deformation images. The image capturing apparatus captures the image beams transmitted from the imaging element along an optic axis.

According to the embodiments of the invention, the stereo image displaying system provides the image beams to at least one user, therefore the user may sense stereo virtual images, and the stereo image capturing system captures stereo image information corresponding to the object for the stereo image displaying system. Besides, the stereo image displaying and capturing system may simultaneously perform the stereo image displaying operation and the stereo image capturing operation, but not limit.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
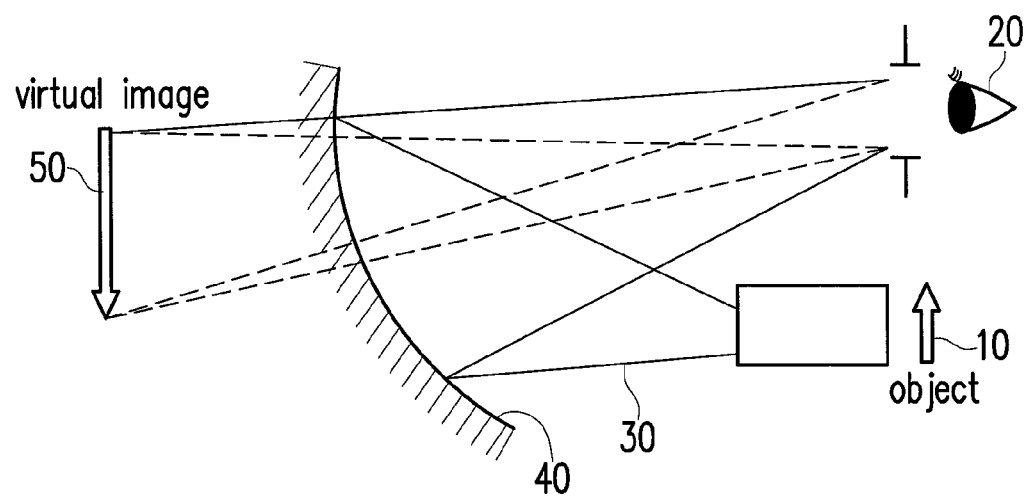
FIG. 1 is a schematic diagram illustrating the imaging principle of virtual images.

Referring to FIG. 1, light beams 30 of an object 10 are transmitted to a mirror 40 and then reflected to the user's eye 20 by the mirror 40. Next, the user may sense a virtual image 50.

Figure 2:
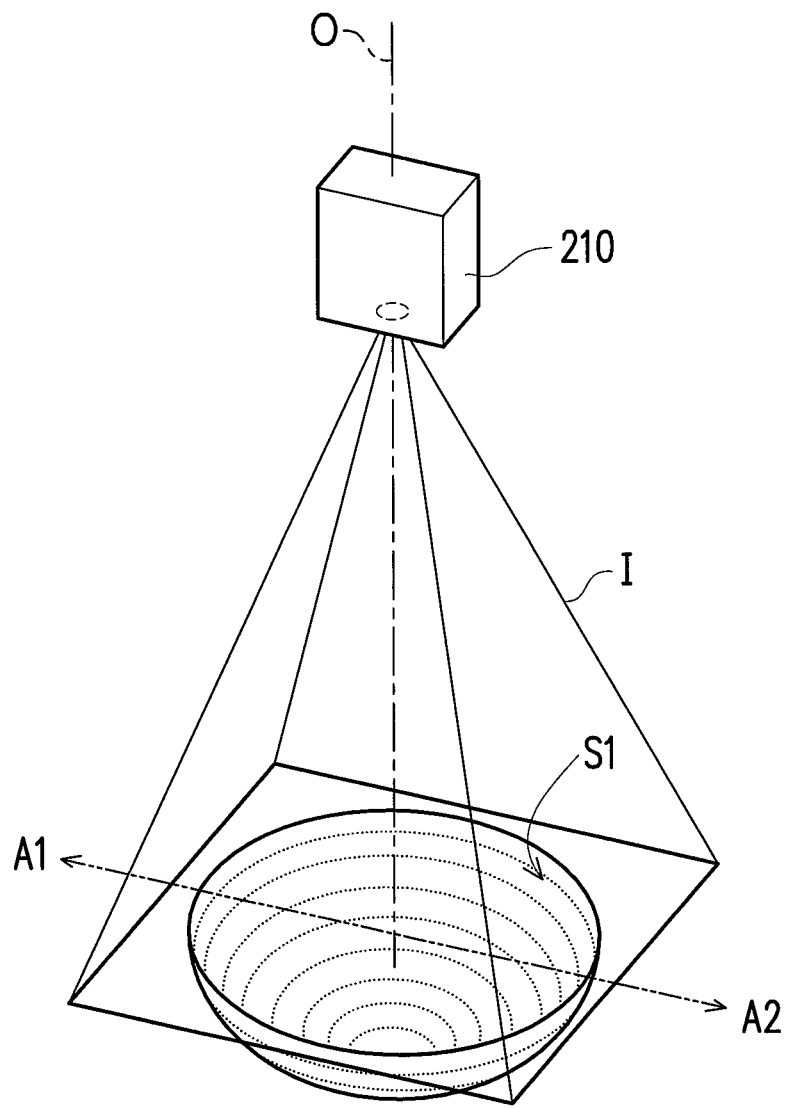
FIG. 2 is a schematic diagram illustrating a stereo image displaying system according to an embodiment of the invention.
Figure 3:
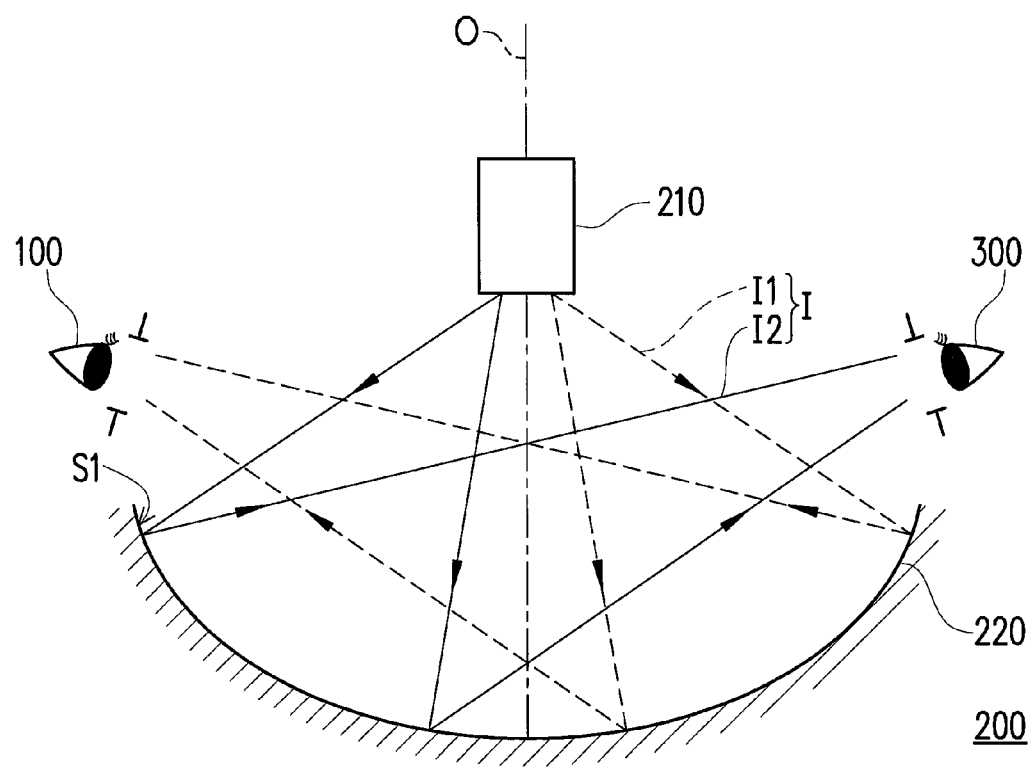
FIG. 3 is a cross-sectional diagram along the line A1-A2 of FIG. 2.

Referring to both FIG. 2 and FIG. 3, the stereo image displaying system 200 of the embodiment includes an image displaying apparatus 210 and an imaging element 220. The image displaying apparatus 210 is configured to display image beams I along an optic axis O to the imaging element 220 in the embodiment. The image beams I displayed from the image displaying apparatus 210 are axial-symmetrical with respect to the optic axis O and the image beams I have deformation image information. The deformation image information may be obtained by processing two-dimensional images corresponding to an object (not shown) based on two-dimensional to three-dimensional images converting methods, or by directly capturing light beams transmitted from the object from different angles based on stereo photography techniques which the person having ordinary skill in the art knew. In the embodiment, the deformation images may have wide angle images or super/ultra wide angle images.

In the embodiment, the imaging element 220 is axial-symmetrical with respect to the optic axis O and has a curved-surface S1. The curved-surface S1 is configured to receive the image beams I and convert the image beams I into deformation images. Next, the curved-surface S1 of the imaging element 220 transmits the deformation images to at least one user. For example, the image beam I1 including a corresponding deformation image from the image beams I is transmitted to the user 100, and the image beam I2 including another corresponding deformation image from the image beams I is transmitted to the second user 300. The user 100 or/and user 300 sense(s) the deformation images from the different angles, such that stereo virtual images corresponding to the deformation image information are respectively reconstructed by the user 100 or/and user 300. That is to say, the image displaying system 200 of the embodiment may not only provide vision functions of stereo images display but also multi-views display. Herein, the user 100 or/and user 300 and the image displaying apparatus 210 are located in an identical side of the imaging element 220. However, in other embodiments, the image beams I may be axial-symmetrical with respect to the optic axis O but the imaging element 220 may not be axial-symmetrical with respect to the optic axis O. Therefore, the invention is not limited thereto.

In the embodiment, the stereo image displaying system 200 operates under a reflection mode, and the imaging element 220 is a reflection mirror for example. Specifically, the imaging element 220 is a concave mirror, and a concave surface of the concave mirror 220 facing towards the image displaying apparatus 210 serves as the curved-surface S1 in the embodiment. The entire concave surface S1 receives the image beams I having the deformation image information and converges the deformation images of the received image beams I to the user 100 or/and user 300 from the different angles, therefore the user 100 or/and user 300 sense(s) the stereo virtual images.

Figure 4:
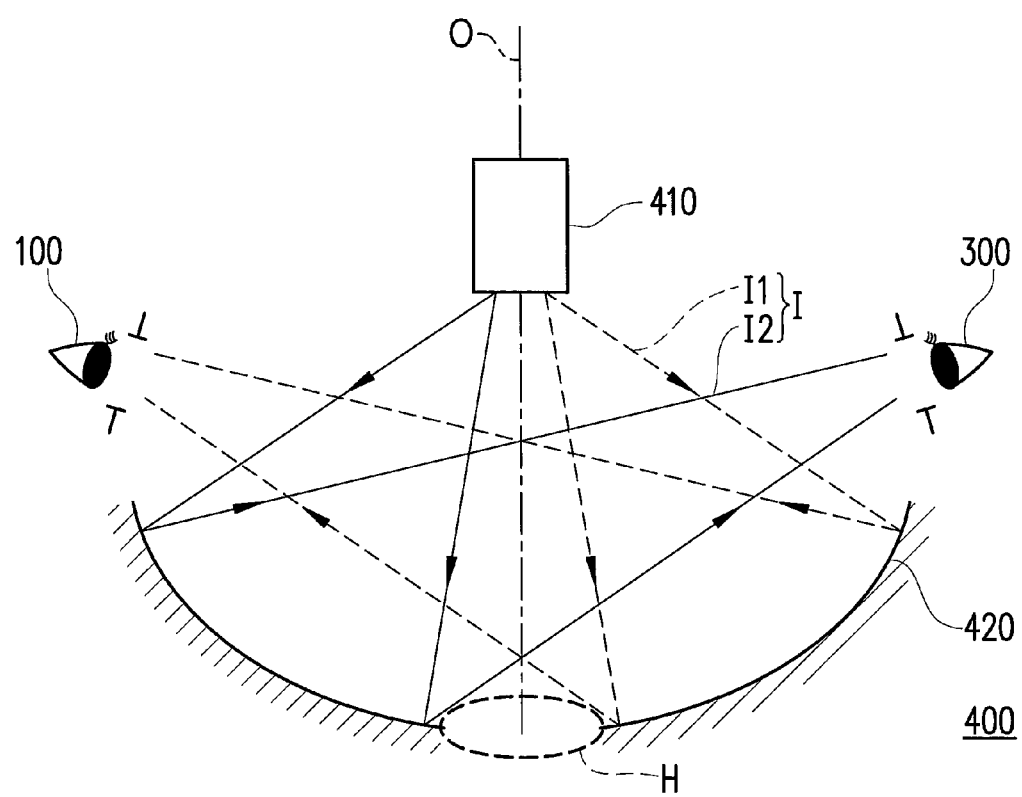
FIG. 4 to FIG. 10 are cross-sectional diagrams of stereo image displaying systems according to other embodiments of the invention.

Referring to FIG. 3 and FIG. 4, a stereo image displaying system 400 of the embodiment is similar to the stereo image displaying system 200 of FIG. 3, and the major difference between FIG. 3 and FIG. 4 is that the imaging element 420 has a hole H located at the bottom of the imaging element 420. The optic axis O may pass through the hole H and the hole H may be also axial-symmetrical with respect to the optic axis O in the embodiment, but the invention is not limited thereto. The hole H located at the bottom of the imaging element 420 would not affect optical properties of the stereo image displaying system 400 and may be convenient for manufacturing the imaging element 420.

Figure 5:
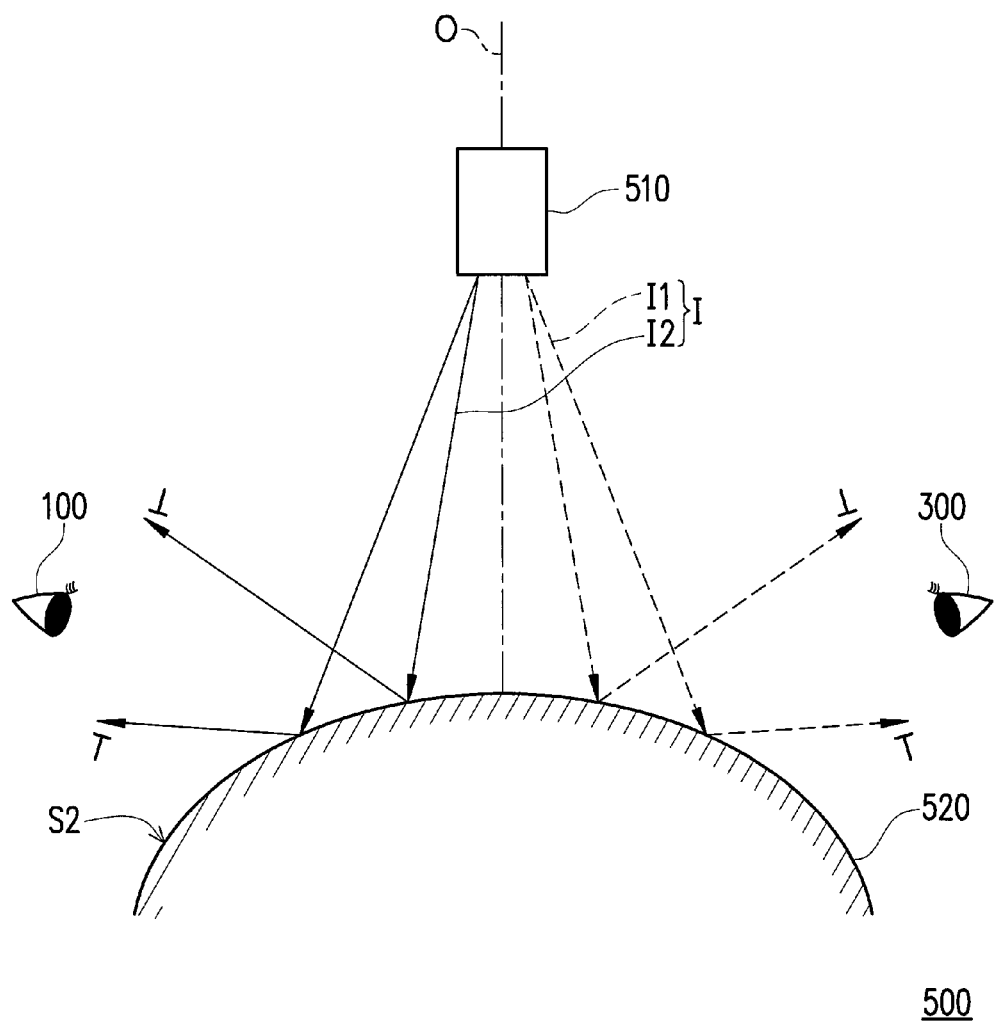

Referring to FIG. 3 and FIG. 5, a stereo image displaying system 500 of the embodiment is similar to the stereo image displaying system 200 of FIG. 3, and the major difference between FIG. 3 and FIG. 5 is that the imaging element 520 is a convex mirror. Specifically, the stereo image displaying system 500 also operates under the reflection mode in the embodiment, and a convex surface of the convex mirror 520 facing towards the image displaying apparatus 510 serves as the curved-surface S2. The convex surface S2 is configured to receive the image beams I having the deformation image information and diverge the deformation images of the received image beams I to the user 100 or/and user 300 from the different angles, therefore the user 100 or/and user 300 sense(s) the stereo virtual images.

In addition, similar to the imaging element 420, the imaging element 520 may has a hole located at the top of the imaging element 520 in another embodiment, and it will not be described again herein. The hole located at the top of the imaging element 520 would not affect optical properties of the stereo image displaying system 500 and may be convenient for manufacturing the imaging element 520 in the case.

Based on the foregoing embodiments, the stereo image displaying systems operate under the reflection mode, but the invention is not limited thereto. The stereo image displaying systems of the disclosure may operate under a transmittance mode. It will be disclosed in the following description.

Figure 6:
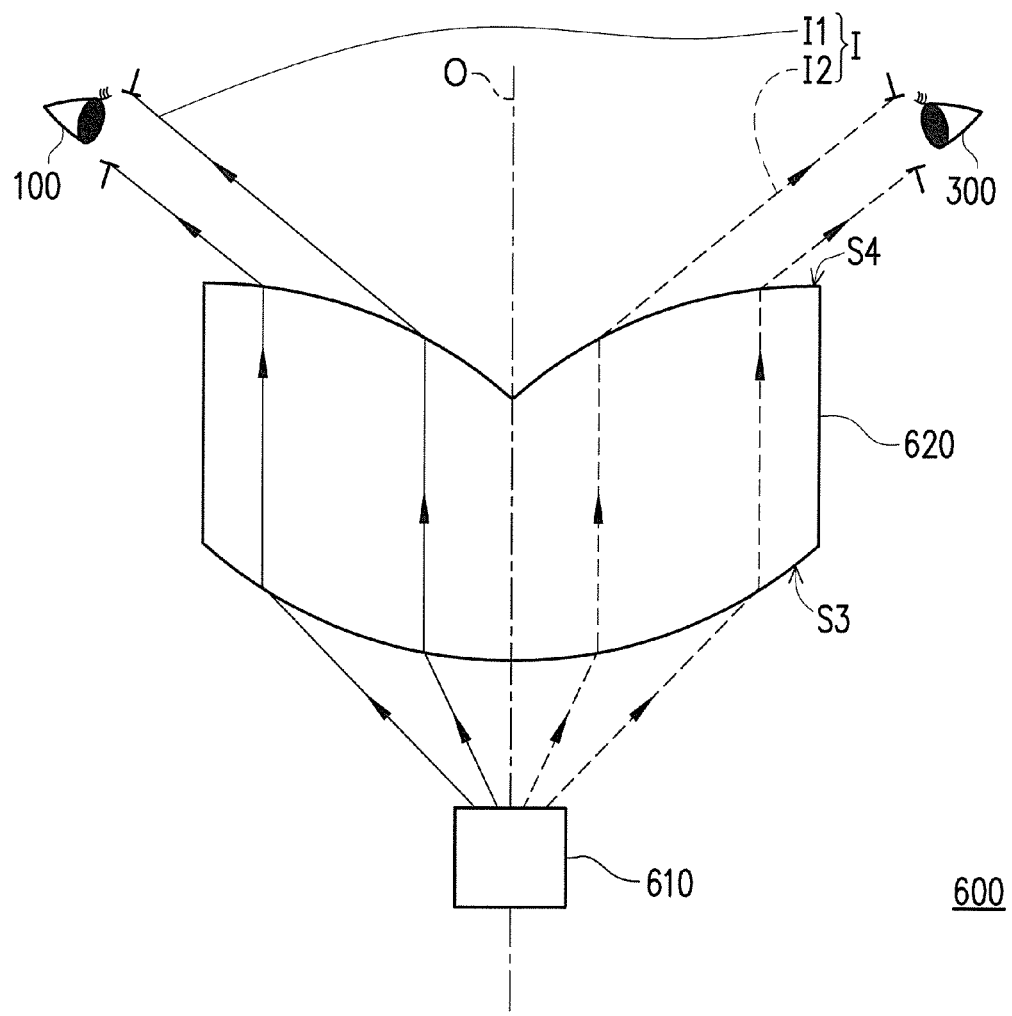

Referring to FIG. 6, the stereo image displaying system 600 of the embodiment includes an image displaying apparatus 610 and an imaging element 620. The function of the image displaying apparatus 610 is similar to that of the image displaying apparatus 210, and it will not be described again herein. In the embodiment, the imaging element 620 is a lens and may be axial-symmetrical with respect to the optic axis O. The imaging element 620 has a light incident surface S3 and a light emitting surface S4. Each of the light incident surface S3 and the light emitting surface S4 is a convex surface.

In the embodiment, for sensing the stereo virtual images, the user 100 or/and user 300 may be located in a top side of the imaging element 620 and the image displaying apparatus 610 may be located in a bottom side of the imaging element 620. Besides, the light incident surface S3 and the light emitting surface S4 serve as the curved-surface of the imaging element 620 and the curved-surface is configured to receive the image beams I having the deformation image information and convert the image beams I into the deformation images. In the embodiment, the light incident surface S3 is configured to receive the image beams I having the deformation image information, and the light emitting surface S4 of the imaging element 620 transmits the deformation images to the user 100 or/and user 300 from the different angles. The user 100 or/and user 300 sense(s) the deformation images, such that stereo virtual images corresponding to deformation image information are respectively reconstructed by the user 100 or/and user 300.

Figure 7:
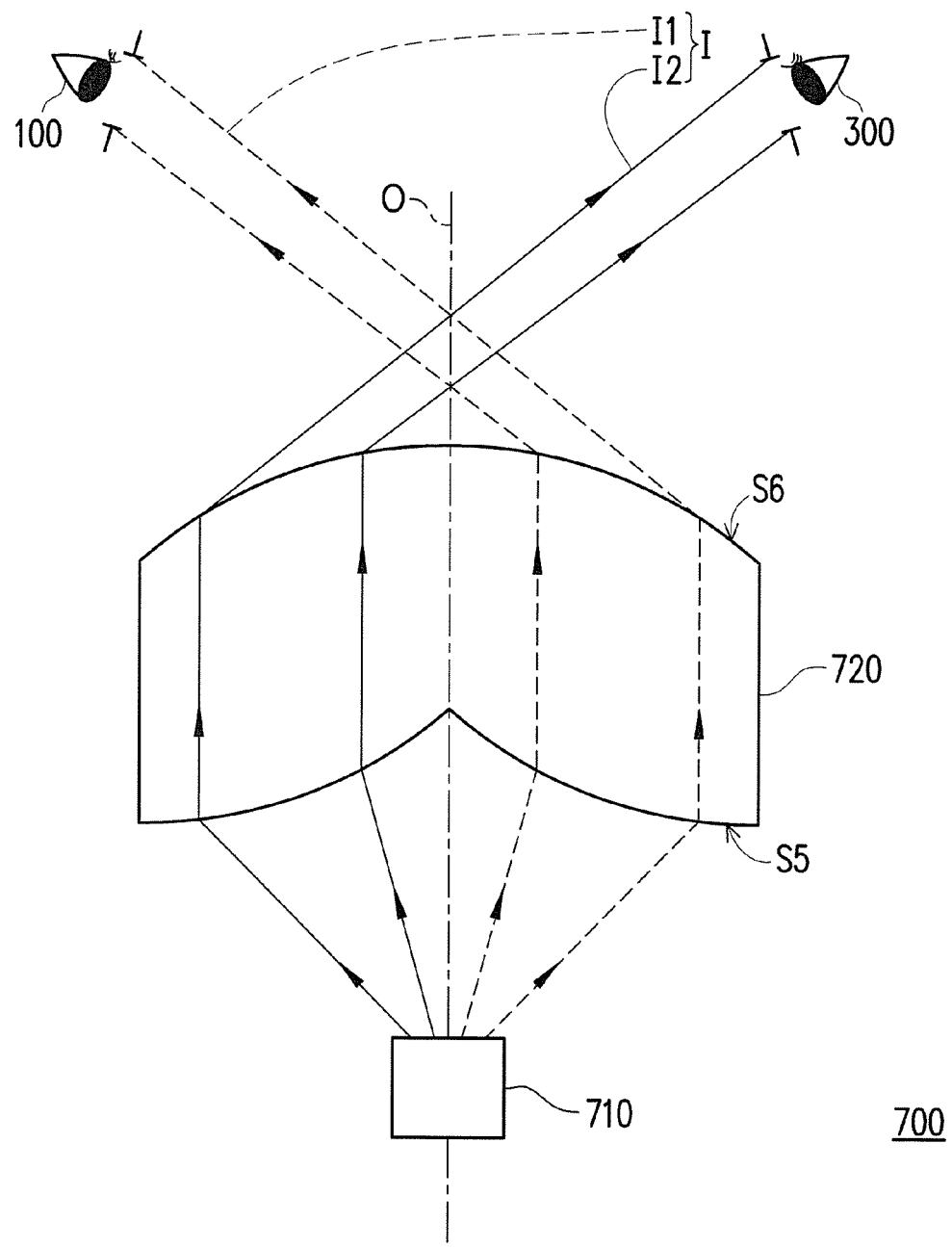

Referring to FIG. 6 and FIG. 7, a stereo image displaying system 700 of the embodiment is similar to the stereo image displaying system 600 of FIG. 6. Specifically, the stereo image displaying system 700 also operates under the transmittance mode in the embodiment, and each of the light incident surface S5 and the light emitting surface S6 is a convex surface. The light incident surface S5 and the light emitting surface S6 serve as the curved-surface of the imaging element 720 and the curved-surface is configured to receive the image beams I and convert the image beams I into the deformation images. In the embodiment, the light incident surface S5 is configured to receive the image beams I, and the light emitting surface S6 of the imaging element 620 transmits the deformation images to the user 100 or/and user 300 from the different angles. The user 100 or/and user 300 respectively sense stereo virtual images according to the deformation images, respectively.

Figure 8:
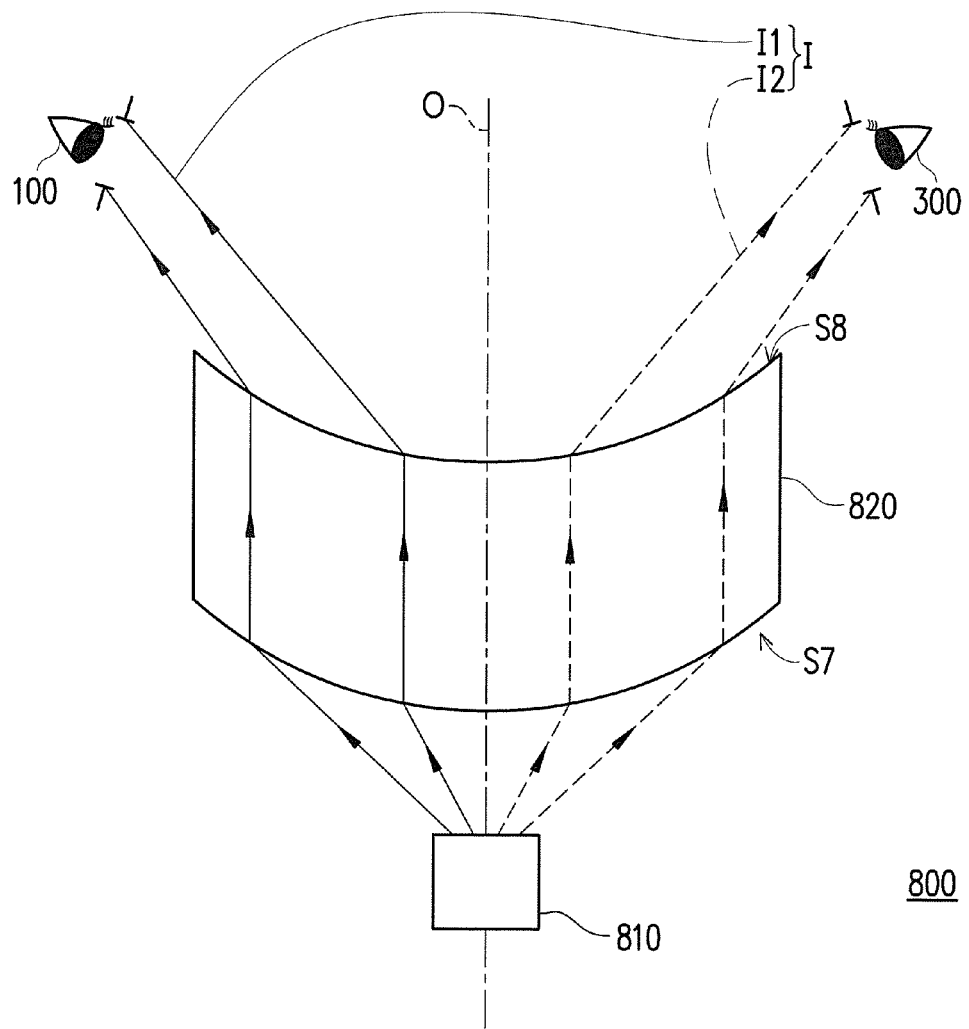

Referring to FIG. 6 and FIG. 8, a stereo image displaying system 800 of the embodiment is similar to the stereo image displaying system 600 of FIG. 6, and the major difference between FIG. 6 and FIG. 8 is that the light emitting surface S8 is a concave surface. Specifically, the stereo image displaying system 800 also operates under the transmittance mode in the embodiment. The light incident surface S7 and the light emitting surface S8 serve as the curved-surface of the imaging element 820 and the curved-surface is configured to receive the image beams I and convert the image beams I into the deformation images. In the embodiment, the light incident surface S7 is configured to receive the image beams I, and the light emitting surface S8 of the imaging element 820 transmits the deformation images to the user 100 or/and user 300 from the different angles. The user 100 or/and user 300 sense(s) stereo virtual images according to the deformation images, respectively.

Figure 9:
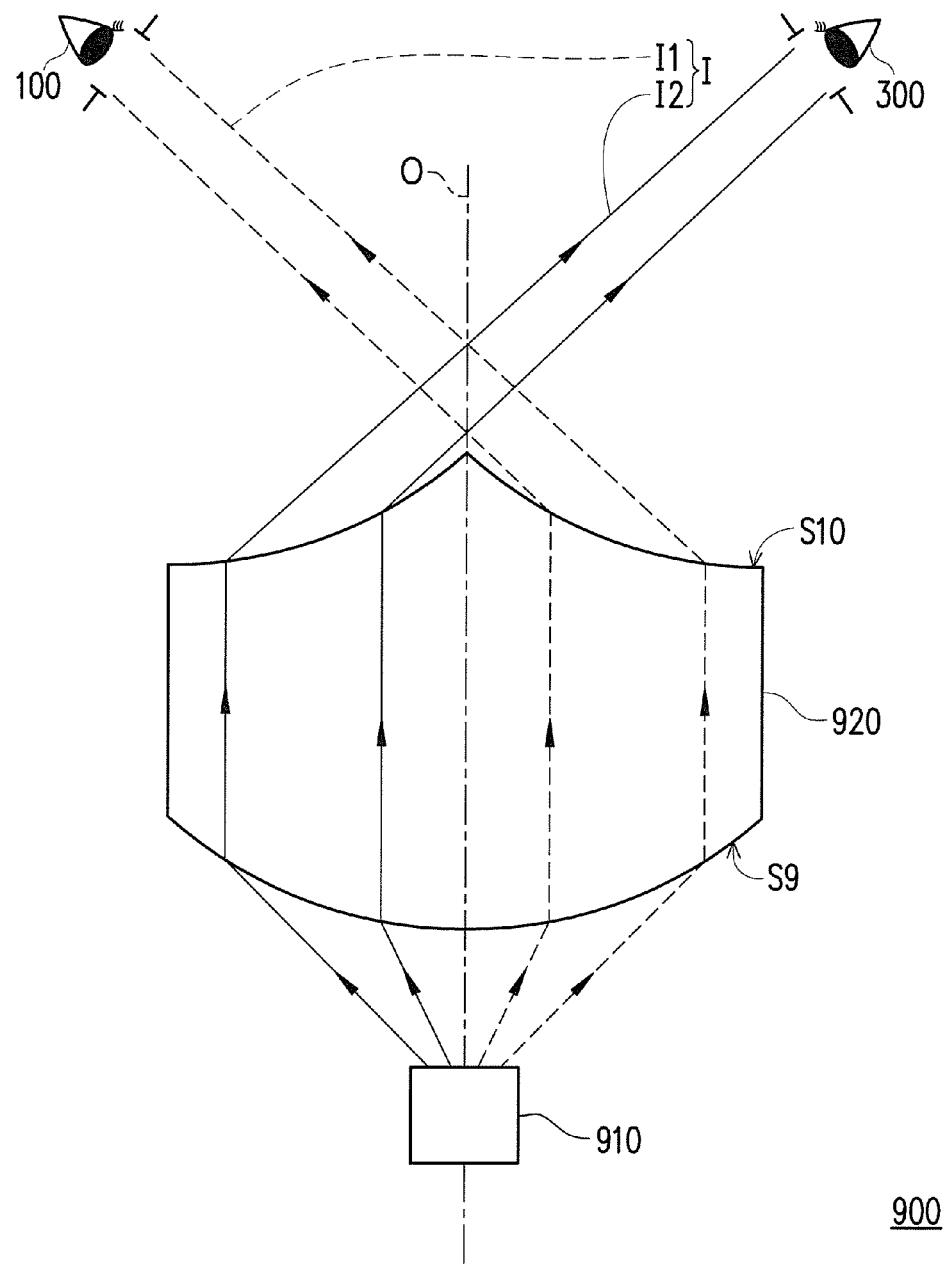

Referring to FIG. 8 and FIG. 9, a stereo image displaying system 900 of the embodiment is similar to the stereo image displaying system 800 of FIG. 8. Specifically, the stereo image displaying system 900 also operates under the transmittance mode in the embodiment, and the light incident surface S9 is a convex surface, and the light emitting surface S10 is a concave surface. The light incident surface S9 and the light emitting surface S10 serve as the curved-surface of the imaging element 920 and the curved-surface is configured to receive the image beams I and convert the image beams I into the deformation images. In the embodiment, the light incident surface S9 is configured to receive the image beams I, and the light emitting surface S10 of the imaging element 920 transmits the deformation images to the user 100 or/and user 300 from the different angles. The user 100 or/and user 300 sense(s) stereo virtual images according to the deformation images.

Figure 10:
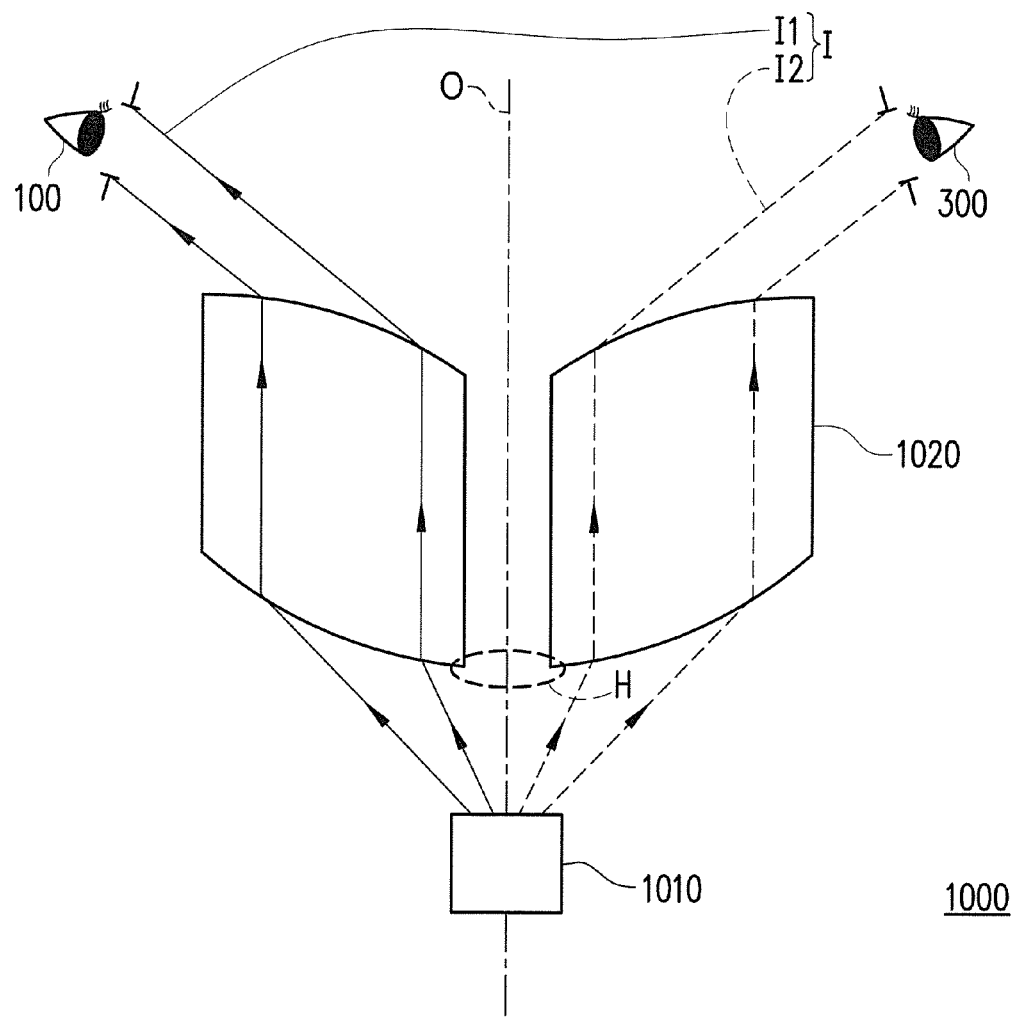

Referring to FIG. 6 and FIG. 10, a stereo image displaying system 1000 of the embodiment is similar to the stereo image displaying system 600 of FIG. 6, and the major difference between FIG. 6 and FIG. 10 is that the imaging element 1020 has a hole H through the center of the imaging element 1020. The optic axis O may pass through the hole H, and the hole H may be axial-symmetrical with respect to the optic axis O in the embodiment, but the invention is not limited thereto. The hole H through the center of the imaging element 1020 would not affect optical properties of the stereo image displaying system 1000 and may be convenient for manufacturing the imaging element 1020.

In summary, the foregoing stereo image displaying systems provide deformation images to the user(s), such that the user(s) senses(sense) stereo virtual images by eyes from different angles. Furthermore, the disclosure also provides stereo image capturing systems to obtain the stereo image information required by the foregoing stereo image displaying systems.

Figure 11:
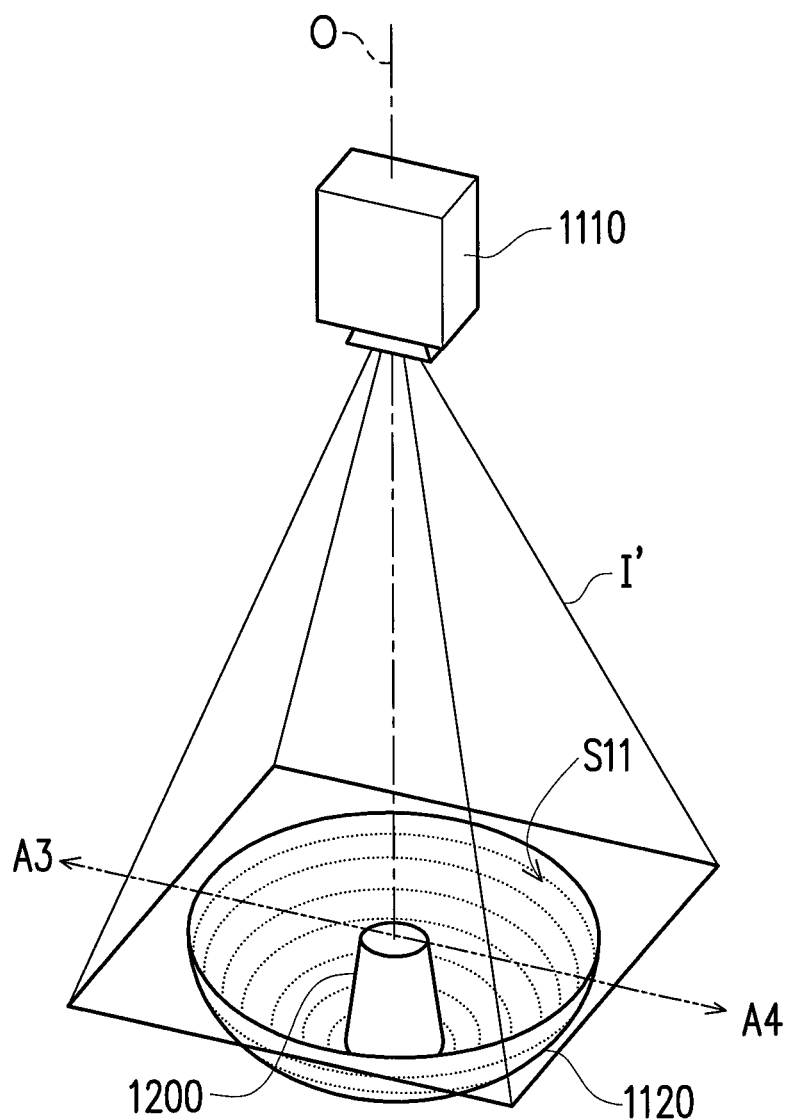
FIG. 11 is a schematic diagram illustrating a stereo image capturing system according to an embodiment of the invention.
Figure 12:
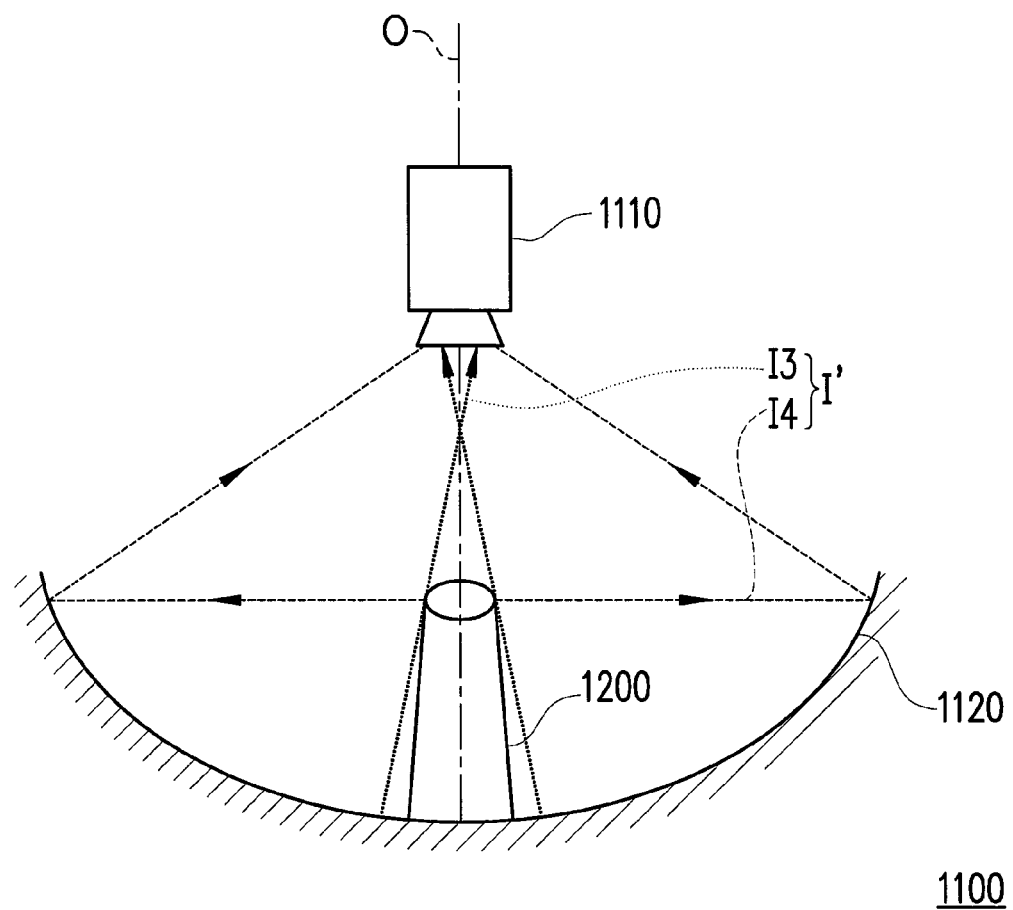
FIG. 12 is a cross-sectional diagram along the line A3-A4 of FIG. 11.

Referring to both FIG. 11 and FIG. 12, the stereo image capturing system 1100 of the embodiment includes an image capturing apparatus 1110 and an imaging element 1120. The image capturing apparatus 1110 is configured to capture image beams resulted from the stereo light beams I' transmitted from an object 1200 via the imaging element 1120 along an optic axis O in the embodiment. The object 1200 may be located at the bottom of the imaging element 1120, but the invention is not limited thereto. The stereo light beams I' transmitted from the object 1200 may be axial-symmetrical with respect to the optic axis in the embodiment. Accordingly, the image capturing apparatus 1110 captures image beams corresponding to the stereo light beams I' from the different angles to obtain different images of the object 1200 seen from the different angles. The images of the object 1200 seen from the different angles may be reconstructed to the vision function of stereo images.

In the embodiment, the object 1200 and the image capturing apparatus 1110 are located in an identical side of the imaging element 1120 to capture the image beams corresponding to the stereo light beams I'. The imaging element 1120 may be axial-symmetrical with respect to the optic axis O and has a curved-surface S11. The curved-surface S11 is configured to receive the stereo light beams I' transmitted from the object 1200 from different angles and convert the received stereo light beams I' into the image beams having deformation images. Next, the curved-surface S11 of the imaging element 1120 transmits the image beams having the deformation images to the image capturing apparatus 1100, such that the image capturing apparatus 1110 captures the image beams having the deformation images corresponding to the stereo light beams I' from the different angles. For example, the light beams 13 including a corresponding deformation image is transmitted to the image capturing apparatus 1110 from a specific angle, and the light beams 14 including another corresponding deformation image is transmitted to the image capturing apparatus 1110 from another specific angle.

In the embodiment, the stereo image capturing system 1100 operates under a reflection mode, and the imaging element 1120 is a reflection mirror for example. Specifically, the imaging element 1120 is a concave mirror, and a concave surface of the concave mirror 220 facing towards the image capturing apparatus 1110 serves as the curved-surface S11 in the embodiment. The concave surface S11 is configured to receive the stereo light beams I' transmitted from the object 1200, and converge and convert the received stereo light beams I' into the image beams having the deformation images to the image capturing apparatus 1110 from the different angles.

Figure 13:
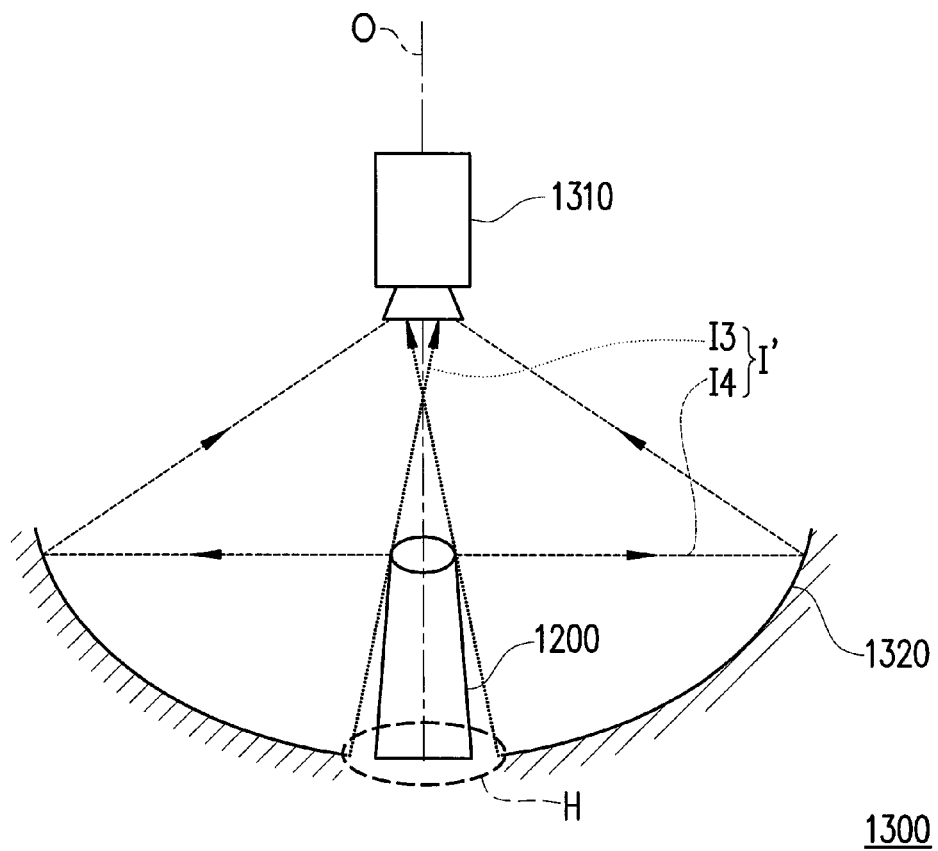
FIG. 13 to FIG. 16 are cross-sectional diagrams of stereo image capturing systems according to other embodiments of the invention.

Referring to FIG. 12 and FIG. 13, a stereo image capturing system 1300 of the embodiment is similar to the stereo image capturing system 1100 of FIG. 12, and the major difference between FIG. 12 and FIG. 13 is that the imaging element 1320 has a hole H located at the bottom of the imaging element 1320. The optic axis O may pass through the hole H, and the hole H may be also axial-symmetrical with respect to the optic axis O in the embodiment, but the invention is not limited thereto. The object to be captured 1200 may be located at the hole for example. The hole H located at the bottom of the imaging element 1320 would not affect optical properties of the stereo image capturing system 1300 and may be convenient for manufacturing the imaging element 1320.

Figure 14:
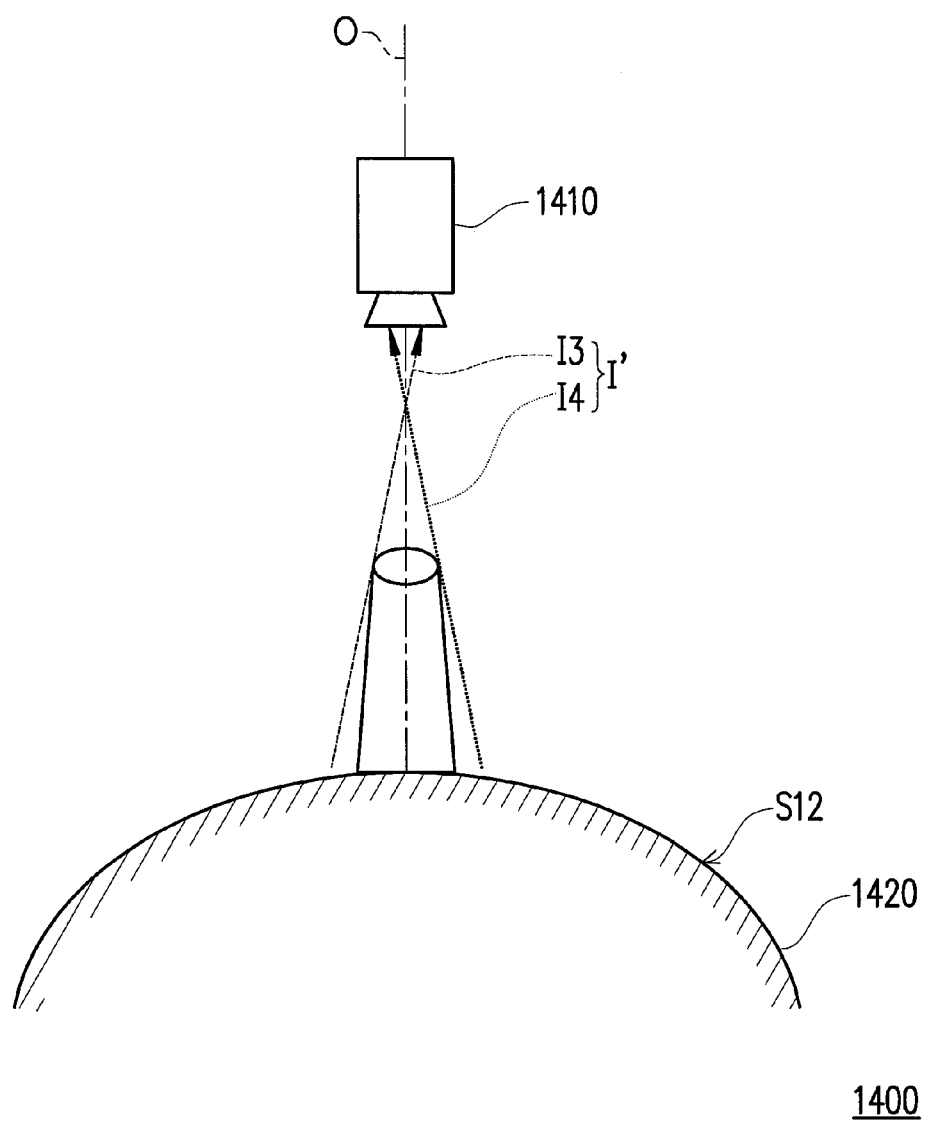

Referring to FIG. 12 and FIG. 14, a stereo image capturing system 1400 of the embodiment is similar to the stereo image capturing system 1100 of FIG. 12, and the major difference between FIG. 12 and FIG. 14 is that the imaging element 1420 is a convex mirror. Specifically, the stereo image capturing system 1400 also operates under the reflection mode in the embodiment, and a convex surface of the convex mirror 1420 facing towards the image capturing apparatus 1410 serves as the curved-surface S12. The convex surface S12 is configured to receive the stereo light beams I' transmitted from the object 1200, and convert and diverge the received stereo light beams I' into image beams having the deformation images to the image capturing apparatus 1410 from the different angles.

In addition, similar to the imaging element 1320, the imaging element 1420 may has a hole located at the top of the imaging element 1420 in another embodiment, and it will not be described again herein. The hole located at the top of the imaging element 1420 would not affect optical properties of the stereo image displaying system 500 and may be convenient for manufacturing the imaging element 1420 in the case.

Based on the foregoing embodiments, the stereo image capturing systems operate under the reflection mode, but the invention is not limited thereto. The stereo image capturing systems of the disclosure may operate under a transmittance mode. It will be disclosed in the following description.

Figure 15:
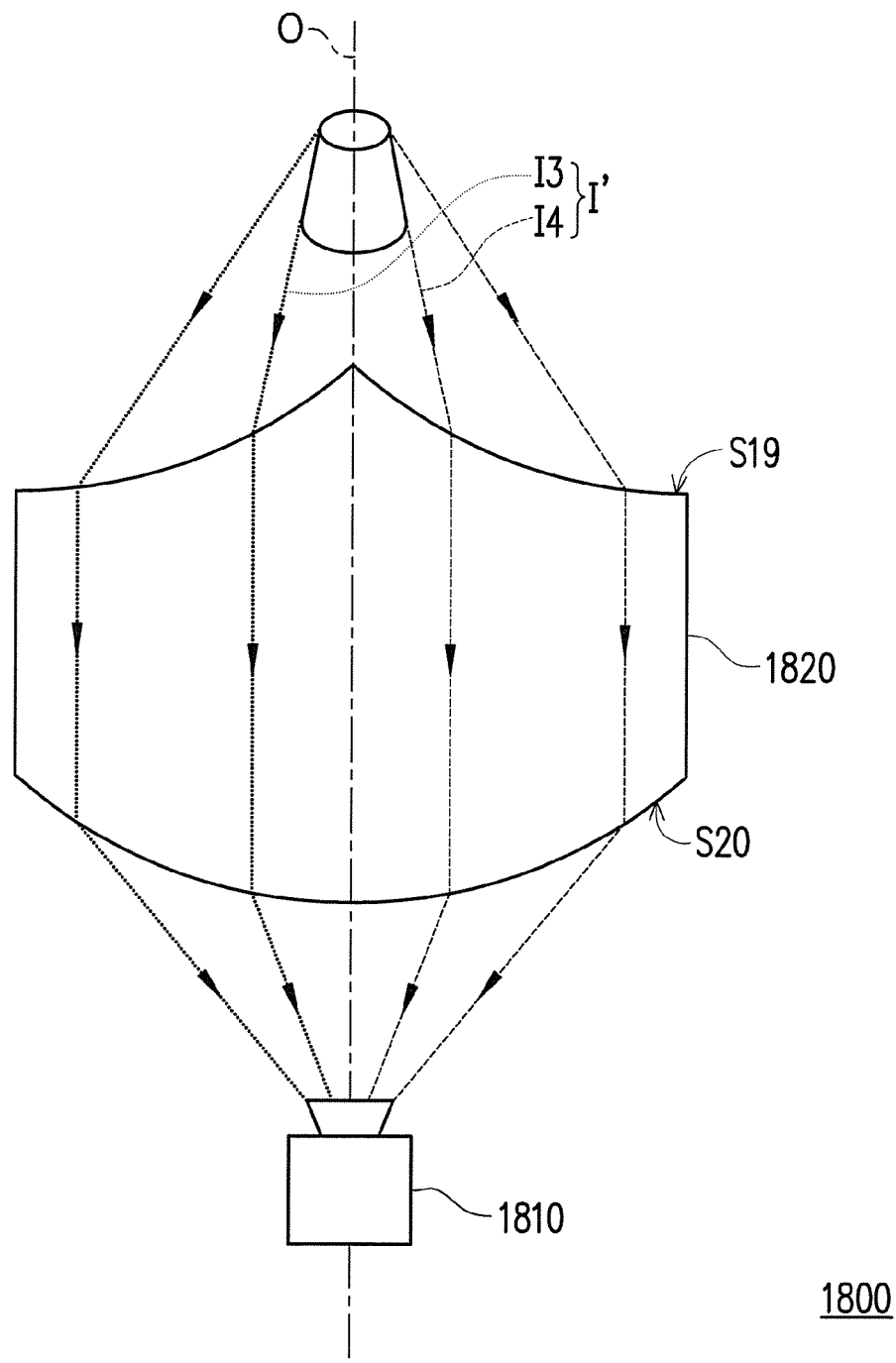

Referring to FIG. 15, the stereo image capturing system 1800 operates under the transmittance mode in the embodiment, and the light incident surface S19 is a concave surface, and the light emitting surface S20 is a convex surface. The light incident surface S19 and the light emitting surface S20 serve as the curved-surface of the imaging element 1820 and the curved-surface is configured to receive the stereo light beams I' and convert the stereo light beams I' into the deformation images. The light incident surface S19 is configured to receive the stereo light beams I', and the light emitting surface S20 of the imaging element 1820 transmits the deformation images to the image capturing apparatus 1710 from the different angles.

Figure 16:
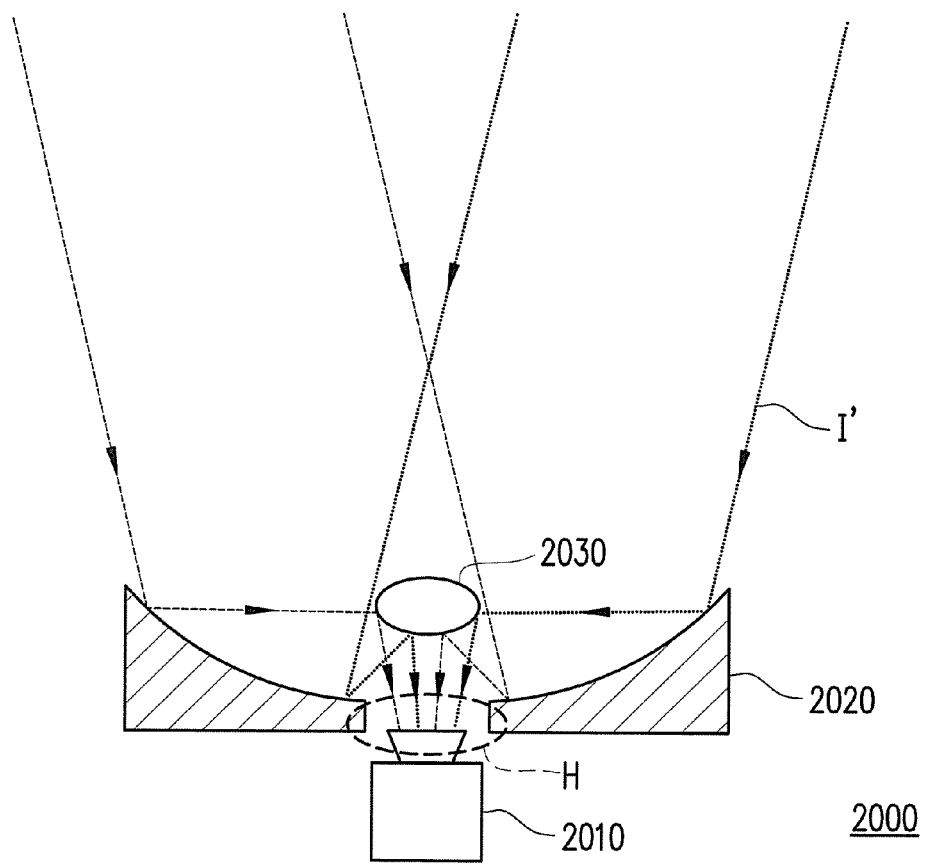

Referring to FIG. 13 and FIG. 16, a stereo image capturing system 2000 of the embodiment is similar to the stereo image capturing system 1300 of FIG. 13, and the major difference between FIG. 12 and FIG. 13 is that the stereo image capturing system 2000 further includes a light collection element 2030. The light collection element 2030 may be a lens and may be located above the hole H and the image capturing apparatus 2010. The optic axis passes through the light collection element 2030 in the embodiment. The object to be captured may be located far away from the stereo image capturing system 2000 and transmits the image beams having the deformation images corresponding to the stereo light beams I' to the stereo image capturing system 2000 in the embodiment. In the embodiment, the stereo light beams I' are first received by the imaging element 2020 and then converted into the image beams having deformation images. The imaging element 2020 reflects the deformation images corresponding to the stereo light beams I' to the light collection element 2030. The light collection element 2030 is configured to collect the deformation images transmitted from the imaging element 2020 and transmit the collected deformation images to the image capturing apparatus 2010. Furthermore, for capturing the deformation images, the object may be located in a top side of the imaging element 2020 and the image capturing apparatus 2010 may be located in a bottom side of the imaging element 2020, but the invention is not limited thereto.

Figure 17:
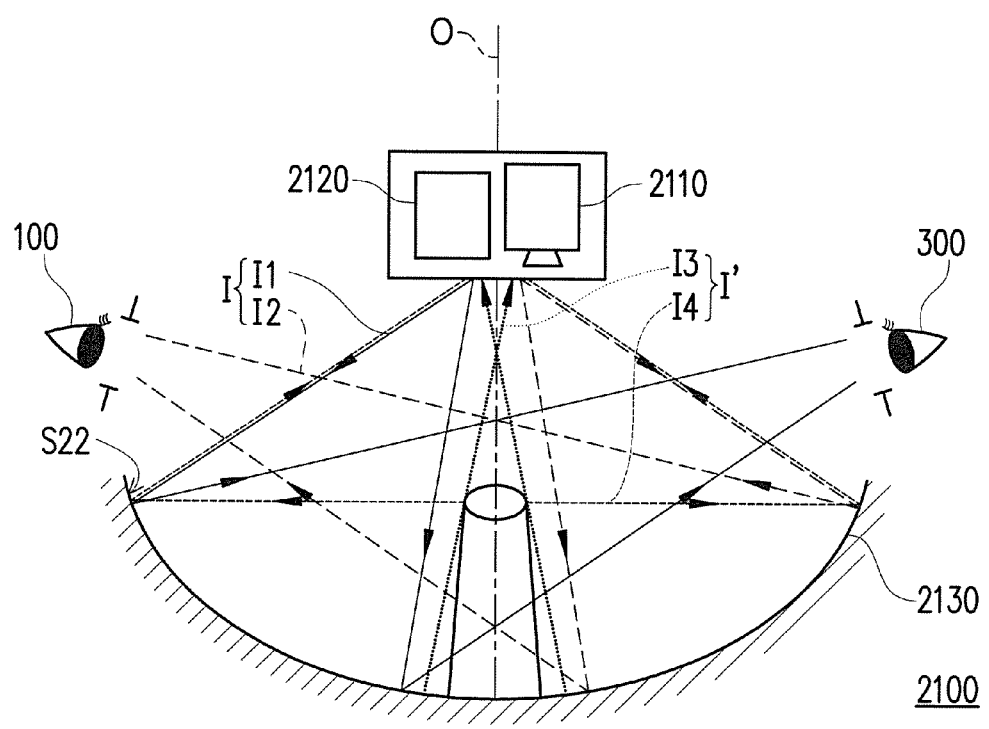
FIG. 17 is a cross-sectional diagram of a stereo image displaying and capturing system according to an embodiment of the invention.

Referring to FIG. 17, the stereo image displaying and capturing system 2100 of the embodiment includes an image capturing apparatus 2110, an image displaying apparatus 2120, and an imaging element 2130. The image capturing apparatus 2110 is configured to capture the stereo light beams I' transmitted from the object 1200 along the optic axis O. The image displaying apparatus 2120 is configured to display the image beams I corresponding to the object 1200 along the optic axis O. The imaging element 2130 has a curved-surface S22. When the stereo image displaying and capturing system 2100 performs a stereo image capturing operation, the curved-surface S22 receives the stereo light beams I' transmitted from the object 1200 from different angles and converts the received stereo light beams I' into deformation images. Next, the curved-surface S22 transmits the deformation images to the image capturing apparatus 2110. The stereo image capturing operation performed in the embodiment of the invention is sufficiently taught, suggested, and embodied in the embodiments illustrated in FIG. 11 to FIG. 15, and therefore no further description is provided herein.

On the other hand, when the stereo image displaying and capturing system 2100 performs a stereo image displaying operation, the curved-surface S21 receives the image beams I and converts the image beams I into the deformation images. Next, the curved-surface S21 transmits the deformation images to the user 100 or/and user 300 from the different angles, and the user 100 or/and user 300 sense(s) the deformation images from the different angles to form stereo virtual images. The stereo image displaying operation performed in the embodiment of the invention is sufficiently taught, suggested, and embodied in the embodiments illustrated in FIG. 2 to FIG. 10, and therefore no further description is provided herein. Besides, the structure of the imaging element 2130 may also be implemented similar to that of the imaging element shown in FIG. 4 to FIG. 10 based on design requirements.

According to the above embodiments of the invention, the stereo image displaying system may provide the image beams to the user(s), therefore the user(s) may sense stereo virtual images. In the embodiment, the stereo image displaying system is configured to be under the reflection mode or the transmittance mode. The stereo image capturing system may capture stereo image information of the object for the stereo image displaying system based on the same structure as that of the stereo image displaying system or not. Besides, the stereo image displaying and capturing system may simultaneously perform the stereo image displaying operation and the stereo image capturing operation based on the structure of the stereo image displaying system or the structure of the stereo image capturing system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A stereo image displaying system, comprising:
    an image displaying apparatus displaying image beams along an optic axis; and
    an imaging element having a curved-surface, the curved-surface receiving the image beams and converting the image beams into deformation images, and the imaging element transmitting the deformation images, wherein at least one user senses stereo virtual images according to the deformation images,
    wherein the imaging element is a convex mirror having a convex surface, and the convex surface serves as the curved-surface and faces towards the image displaying apparatus for receiving the image beams and diverging the deformation images corresponding to the received image beams.

2. The stereo image displaying system according to claim 1, wherein the imaging element is capable of transmitting the deformation images to the at least one user.

3. The stereo image displaying system according to claim 1, wherein the image beams are axial-symmetrical with respect to the optic axis.

4. The stereo image displaying system according to claim 1, wherein the curved-surface is axial-symmetrical with respect to the optic axis.

5. A stereo image displaying system, comprising:
    an image displaying apparatus displaying image beams along an optic axis; and
    an imaging element having a curved-surface, the curved-surface receiving the image beams and converting the image beams into deformation images, and the imaging element transmitting the deformation images, wherein at least one user senses stereo virtual images according to the deformation images,
    wherein the imaging element is a lens having a light incident surface and a light emitting surface, each of the light incident surface and the light emitting surface is a convex surface, and the light incident surface and the light emitting surface serve as the curved-surface.

6. A stereo image displaying system, comprising:
    an image displaying apparatus displaying image beams along an optic axis; and
    an imaging element having a curved-surface, the curved-surface receiving the image beams and converting the image beams into deformation images, and the imaging element transmitting the deformation images, wherein at least one user senses stereo virtual images according to the deformation images,
    wherein the imaging element is a lens having a light incident surface and a light emitting surface, the light incident surface is a convex surface, the light emitting surface is a concave surface, and the light incident surface and the light emitting surface serve as the curved-surface.

7. The stereo image displaying system according to claim 1, wherein the imaging element has a hole, and the optic axis passes through the hole.

8. The stereo image displaying system according to claim 1, further comprising:
    an another imaging element having a curved-surface receiving stereo light beams according to an object and converting the stereo light beams into image beams having another deformation images; and
    an image capturing apparatus capturing the image beams having the another deformation images transmitted from the another imaging element along an another optic axis.

9. A stereo image capturing system, comprising:
    an imaging element having a curved-surface, the curved-surface receiving stereo light beams according to an object and converting the stereo light beams into image beams having deformation images; and
    an image capturing apparatus capturing the image beams transmitted from the imaging element along an optic axis,
    wherein the imaging element is a convex mirror having a convex surface, and the convex surface serves as the curved-surface and faces towards the image capturing apparatus for receiving the stereo light beams and diverging the deformation images corresponding to the received stereo light beams to the image capturing apparatus from the different angles.

10. The stereo image capturing system according to claim 9, wherein the stereo light beams according to the object are axial-symmetrical with respect to the optic axis.

11. The stereo image capturing system according to claim 9, wherein the curved-surface is axial-symmetrical with respect to the optic axis.

12. The stereo image capturing system according to claim 9, wherein the object and the image capturing apparatus are located in an identical side of the imaging element, and the object is located in a central area of the imaging element.

13. The stereo image capturing system according to claim 9, further comprising:
    a light collection element collecting the deformation images transmitted from the imaging element and transmitting the collected deformation images to the image capturing apparatus, wherein the optic axis passes through the light collection element.

14. A stereo image capturing system, comprising:
    an imaging element having a curved-surface, the curved-surface receiving stereo light beams according to an object and converting the stereo light beams into image beams having deformation images; and
    an image capturing apparatus capturing the image beams transmitted from the imaging element along an optic axis,
    wherein the imaging element is a lens having a light incident surface and a light emitting surface, the light incident surface is a concave surface, the light emitting surface is a convex surface, and the light incident surface and the light emitting surface serve as the curved-surface.

15. The stereo image capturing system according to claim 9, wherein the object is located in a first side of the imaging element, the image capturing apparatus is located in a second side of the imaging element, and the second side is opposite to the first side.

16. The stereo image capturing system according to claim 9, wherein the imaging element has a hole, and the optic axis passes through the hole.

* * * * *